United States Patent
Kulkarni et al.

(10) Patent No.: US 11,797,416 B2
(45) Date of Patent: Oct. 24, 2023

(54) DETECTING PERFORMANCE DEGRADATION IN REMOTELY DEPLOYED APPLICATIONS

(71) Applicant: International Business Machines Corporation, Armonk, NY (US)

(72) Inventors: Vaibhav Murlidhar Kulkarni, Bangalore (IN); Sweta Singh, Bangalore (IN); Aiswarya L. Mohanasundaram, Bangalore (IN); Srikkanth R Kulkarni, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 17/031,904

(22) Filed: Sep. 25, 2020

(65) Prior Publication Data

US 2022/0100632 A1 Mar. 31, 2022

(51) Int. Cl.
*G06F 11/30* (2006.01)
*G06F 11/34* (2006.01)
(Continued)

(52) U.S. Cl.
CPC ........ *G06F 11/3466* (2013.01); *G06F 9/5072* (2013.01); *G06F 11/302* (2013.01);
(Continued)

(58) Field of Classification Search
CPC ............... G06F 11/3466; G06F 11/302; G06F 11/3668; G06K 9/6262
See application file for complete search history.

(56) References Cited

U.S. PATENT DOCUMENTS 8,707,300 B2   4/2014  Govindan
10,824,536 B1*  11/2020  Vyas .................. G06F 11/3476
(Continued)

FOREIGN PATENT DOCUMENTS

CN       106155876 A     11/2016
CN       106776337 A      5/2017
(Continued)

OTHER PUBLICATIONS

Notification of Transmittal of the International Search Report and the Written Opinion of the International Searching Authority, or the Declaration, From the International Searching Authority, International application No. PCT/CN2021/118227, dated Dec. 17, 2021, 9 pgs.

(Continued)

*Primary Examiner* — Yolanda L Wilson
(74) *Attorney, Agent, or Firm* — Randy Tejeda

(57) ABSTRACT

Some embodiments of the present invention are directed towards techniques for validating performance degradation of cloud deployed application from neighbor based variability. Historical runs of an application deployed in a cloud environment are received. In these embodiments, a subset of these historical runs, using associated performance metrics recorded during the historical runs, are compared against performance metrics of a current version of the application which is deployed in a cloud environment to determine a subset of historical runs similar to the current version. The determined subset is then used to draw comparisons with performance metrics of a baseline run of the application to validate if a performance degradation has occurred by updating the application to the current version, reducing the impact of neighbor-based variability on evaluating performance degradation. Detailed performance analysis resources are less likely to be expended on performance (Continued)

degradation caused by neighbor activities in the cloud environment.

15 Claims, 8 Drawing Sheets

(51) Int. Cl.
    *G06F 9/50*     (2006.01)
    *G06F 11/36*     (2006.01)
    *G06F 18/21*     (2023.01)
    *G06F 18/23213*     (2023.01)

(52) U.S. Cl.
    CPC ........ *G06F 11/3668* (2013.01); *G06F 18/217* (2023.01); *G06F 18/23213* (2023.01)

(56) References Cited

U.S. PATENT DOCUMENTS

| | | | | |
|---|---|---|---|---|
| 11,323,379 | B2* | 5/2022 | Iyengar | H04L 43/10 |
| 11,347,621 | B1* | 5/2022 | Alt | G06Q 10/0637 |
| 2012/0079456 | A1* | 3/2012 | Kannan | G06F 11/3466 |
| | | | | 717/124 |
| 2013/0173962 | A1* | 7/2013 | Li | G06F 11/3688 |
| | | | | 714/E11.02 |
| 2015/0229582 | A1 | 8/2015 | Zhu | |
| 2015/0254162 | A1* | 9/2015 | Baril | G06F 11/3466 |
| | | | | 717/128 |
| 2016/0117235 | A1* | 4/2016 | Mishra | G06F 11/3688 |
| | | | | 714/38.1 |
| 2019/0354388 | A1* | 11/2019 | Mitra | G06F 9/45558 |
| 2020/0242000 | A1* | 7/2020 | Khosrowpour | G06F 11/3608 |
| 2021/0084375 | A1* | 3/2021 | Park | G06K 9/6219 |
| 2022/0100632 | A1* | 3/2022 | Kulkarni | G06F 11/302 |

FOREIGN PATENT DOCUMENTS

| | | |
|---|---|---|
| CN | 108334440 A | 7/2018 |
| CN | 109857431 A | 6/2019 |

OTHER PUBLICATIONS

Amannejad, et al., "Detecting Performance Interference in Cloud-Based Web Services", 2015 IFIP/IEEE International Symposium on Integrated Network Management (IM), May 15, 2015, pp. 423-431, <https://ieeexplore.ieee.org/document/7140319>.

Ayodele, et al., "Performance Measurement and Interference Profiling in Multi-tenant Clouds", 2015 IEEE 8th International Conference on Cloud Computing, Jul. 2, 2015, pp. 941-949, <https://ieeexplore.ieee.org/document/7214138>.

Mell et al., "The NIST Definition of Cloud Computing", National Institute of Standards and Technology, Special Publication 800-145, Sep. 2011, 7 pages.

Nikounia, et al., "Hypervisor and Neighbors' Noise: Performance Degradation in Virtualized Environments", IEEE Transactions on Services Computing, Aug. 5, 2015, 11 pages, <https://ieeexplore.ieee.org/document/7180396>.

* cited by examiner

DETECTING PERFORMANCE DEGRADATION IN REMOTELY DEPLOYED APPLICATIONS

BACKGROUND

The present invention relates generally to the field of cloud-based software applications for detecting performance degradation in remotely deployed applications, and more particularly to isolating neighbor-based variability from impacting performance evaluations for updates to cloud-based software.

Cloud computing is the on-demand availability of computer system resources, especially data storage (cloud storage) and computing power, without direct active management by the user of the resources. The term is typically used to describe data centers available to many users over the Internet. Large clouds, which are predominant today, often have functions distributed over several locations from central servers. If the connection to the user is relatively close in geographic terms, it may be designated as an edge server. Clouds may be limited to a single organization or be available to multiple organizations, which may also be known as multitenant or multitenancy. Cloud computing relies on the sharing of resources to achieve coherence and enhanced value through economies of scale.

Software multitenancy refers to a software architecture in which a single instance of software runs on a server and serves several tenants. Systems designed in such manner are often called shared (which is in contrast to dedicated or isolated). A tenant a user or a group of users who share a common access with specific privileges to the software instance. With a multitenant architecture, a software application is designed to provide each tenant a dedicated share of the instance—including its data, user management, configuration, tenant individual functionality and non-functional properties.

In software quality assurance, performance testing is in general a testing practice performed to measure how a system performs in terms of responsiveness and stability under a particular workload. It can also serve to investigate, measure, validate or verify other quality attributes of the system, such as scalability, reliability and resource usage. Performance testing, which is a subset of performance engineering, is a computer science practice which aims to build performance standards into the implementation, design and architecture of a system. A performance test might constitute running a specific version of a piece of software through a "test run" or run of functionality and compare responsiveness and resource usage relative to previous versions of the piece of software.

SUMMARY

According to an aspect of the present invention, there is a method, computer program product and/or system that performs the following operations (not necessarily in the following order): (i) receiving a historical run data set corresponding to historical runs of a cloud application; (ii) receiving a monitoring data set corresponding to a current test run of an updated version of the cloud application; (iii) determining a subset of runs from the historical run data set which are most similar to the current test run; and (iv) automatically validating that the current test run is a real performance degradation based, at least in part, on the determined subset of runs.

DETAILED DESCRIPTION

Figure 1:
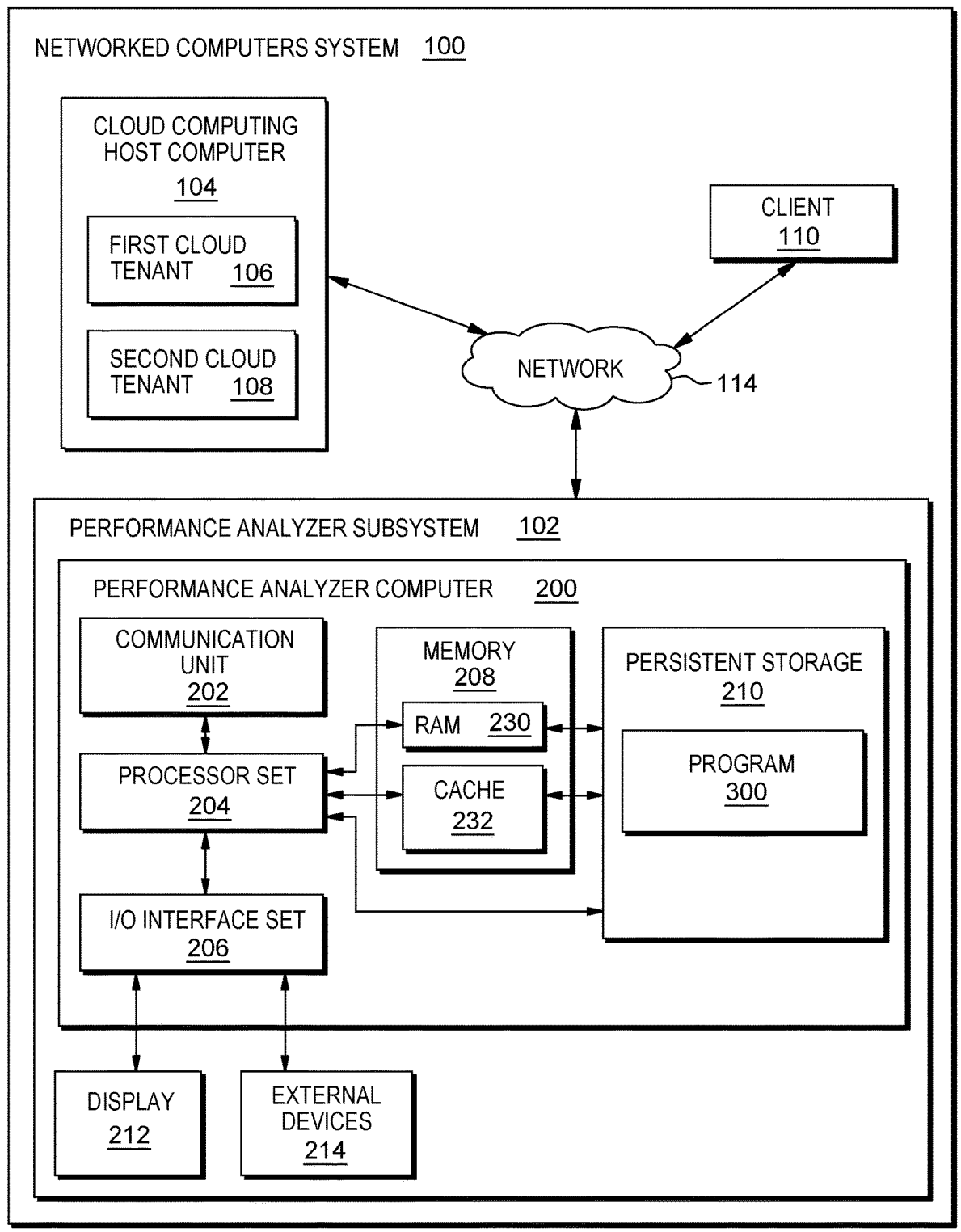
FIG. 1 is a block diagram view of a first embodiment of a system according to the present invention.

Some embodiments of the present invention are directed to techniques for validating performance degradation of cloud deployed application from neighbor based variability. Historical runs of an application deployed in a cloud environment are received. In these embodiments, a subset of these historical runs, using associated performance metrics recorded during the historical runs, are compared against performance metrics of a current version of the application which is deployed in a cloud environment to determine a subset of historical runs similar to the current version. The determined subset is then used to draw comparisons with performance metrics of a baseline run of the application to validate if a performance degradation has occurred by updating the application to the current version, reducing the impact of neighbor-based variability on evaluating performance degradation. Detailed performance analysis resources are less likely to be expended on performance degradation caused by neighbor activities in the cloud environment.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); cloud computing host computer 104; client subsystem 110; and communication network 114. Server subsystem 102 includes: server computer 200; communication unit 202; processor set 204; input/output (I/O) interface set 206; memory 208; persistent storage 210; display 212;

external device(s) 214; random access memory (RAM) 230; cache 232; and program 300. Cloud computing host computer 104 includes: first cloud tenant 106; and second cloud tenant 108.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
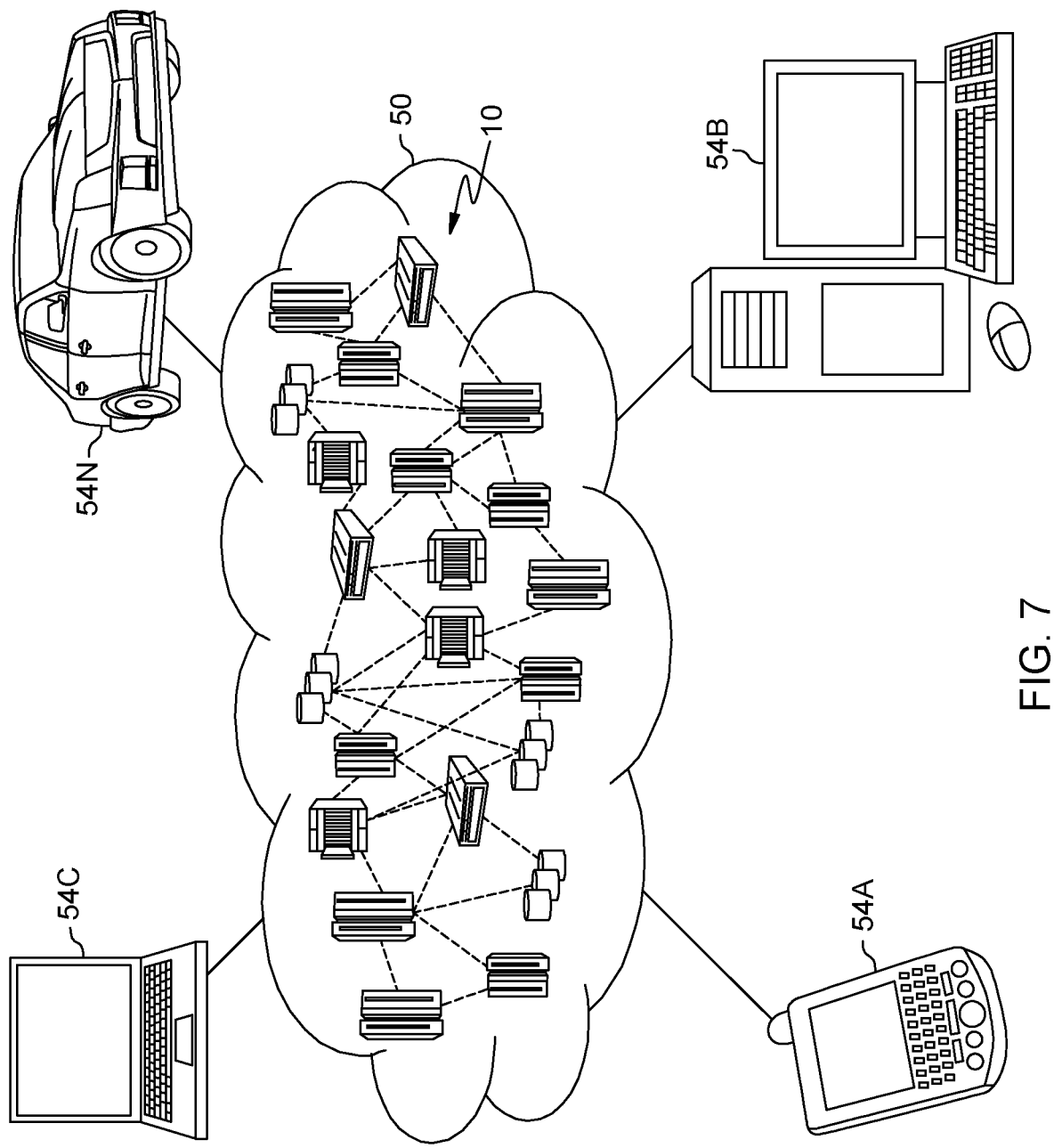
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
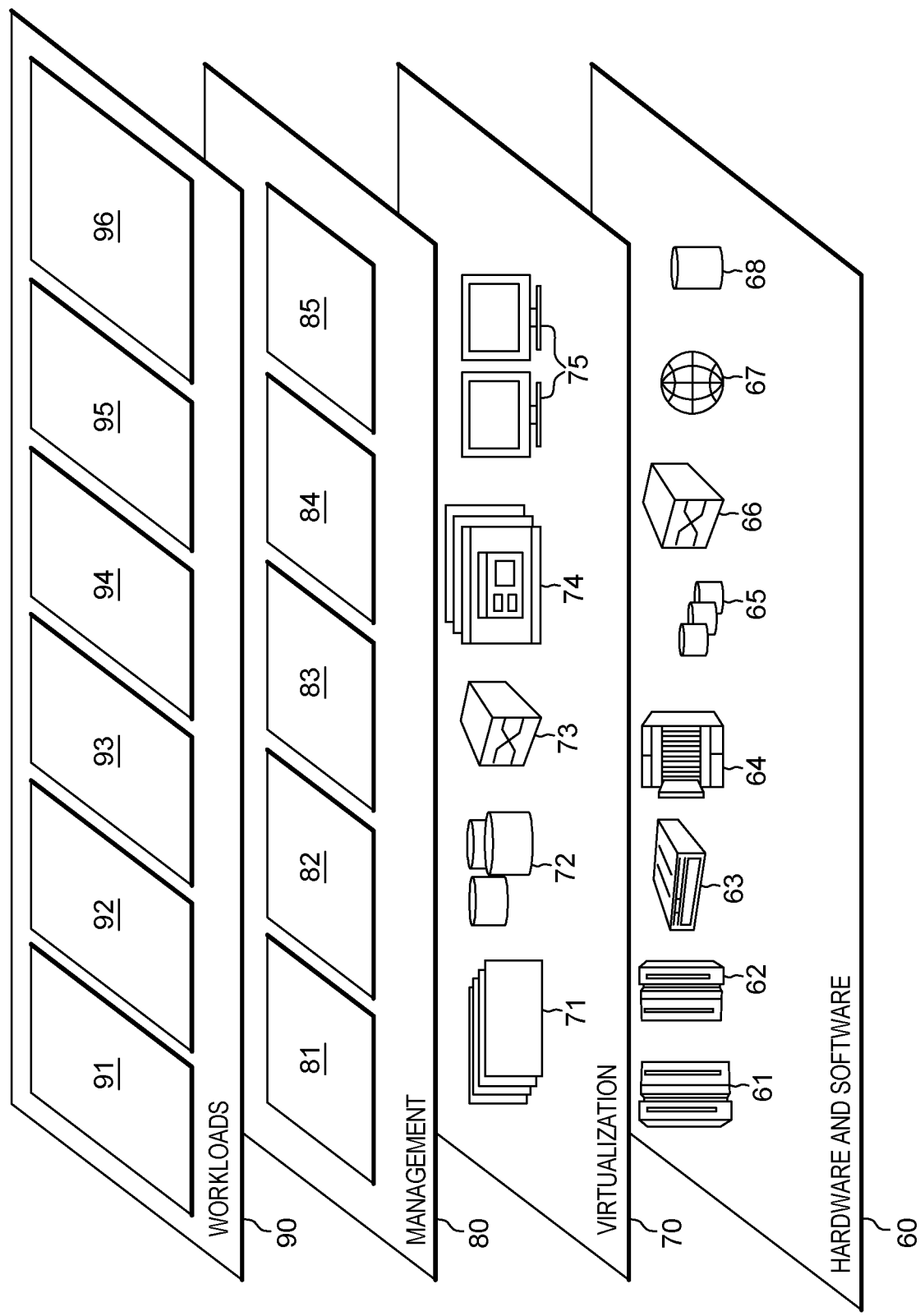
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance analyzer 96.

II. Example Embodiment

Figure 2:
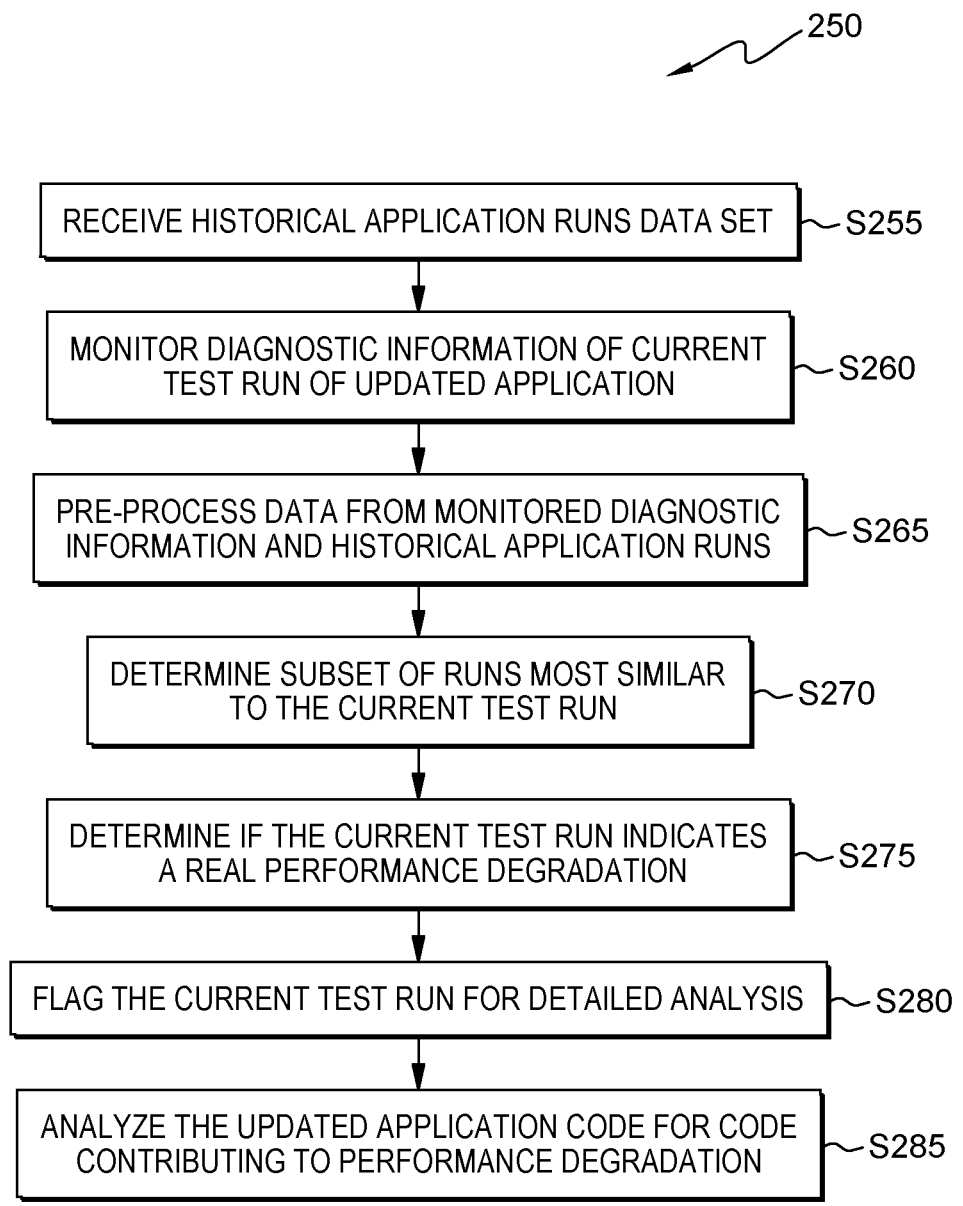
FIG. 2 is a flowchart showing a first embodiment method performed, at least in part, by the first embodiment system.
Figure 3:
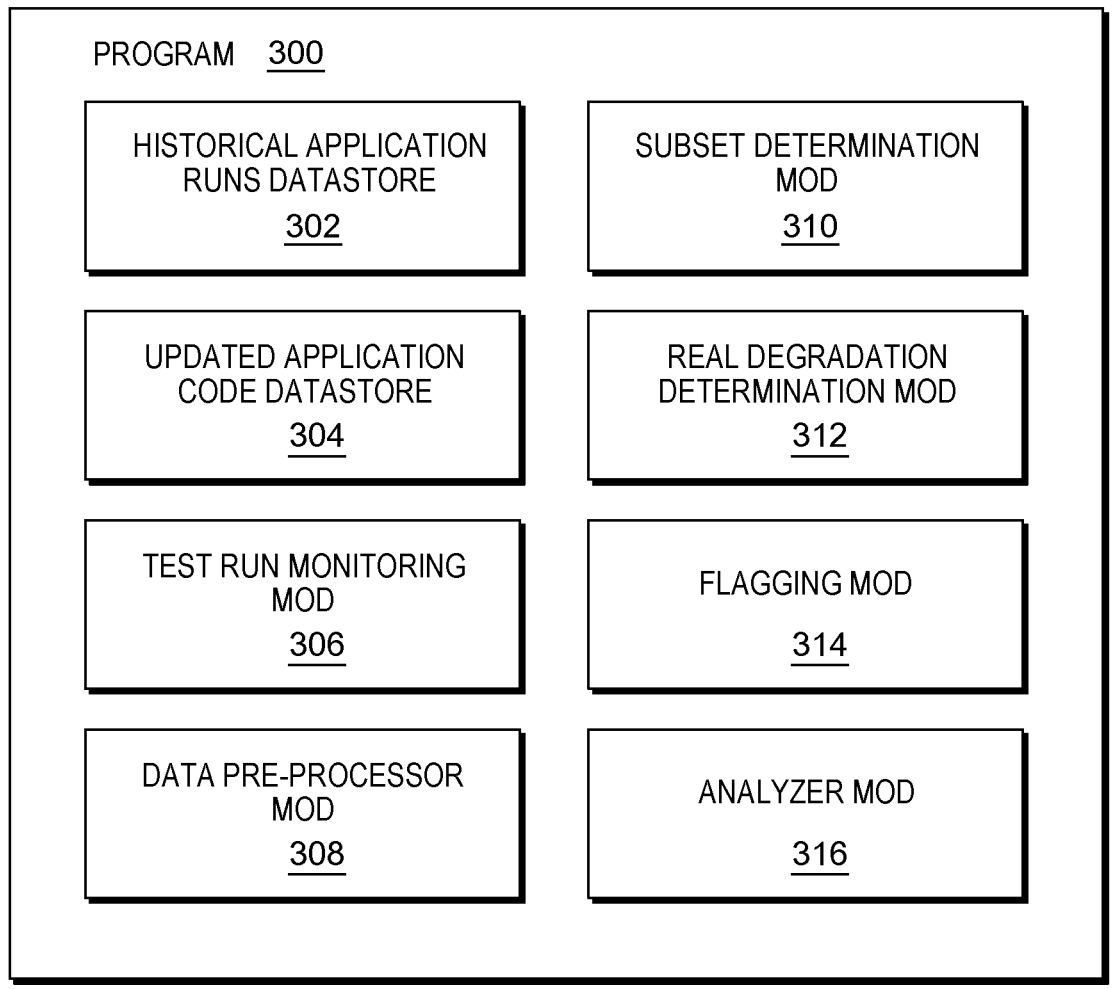
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where historical applications runs datastore module ("mod") 302 receives a historical application runs data set. In this simplified embodiment, the application that is the subject of this example is called ExampleApp, and the newly updated version of ExampleApp is version 5. The historical application runs data set includes three historical runs of ExampleApp (versions 1, 2 and 3), which include measurements of certain performance metrics for a period of operation for each of those versions. From version 1 through version 5, ExampleApp is and has been hosted on ExampleCloud as one of several tenants that operate workloads on ExampleCloud. More specifically, in this simplified embodiment, ExampleCloud includes cloud computing host computer 104 of FIG. 1, where ExampleApp is operated as first cloud tenant 106 and another tenant is present as second cloud tenant 108. In this example embodiment, the historical application runs data set includes three performance metrics: (i) CPU cycles across the entire run of the version; (ii) input/output (IO) interface bits across the entire run of the version; and (iii) network interface upload/download bits across the entire run of the version. In the historical application runs data set of ExampleApp, the performance metrics for version 1 are as follows: (i) 5000 CPU cycles over 10 hours; (ii) 10000 bits over 10 hours; and (iii) 3000 bits over ten hours. In the historical application runs data set of ExampleApp, the performance metrics for version 2 are as follows: (i) 4400 ticks over eight hours; (ii) 8040 bits over eight hours; and (iii) 2200 bits over eight hours. In the historical application runs data set of ExampleApp, the performance metrics for version 3 are as follows: (i) 6300 ticks over twelve hours; (ii) 12120 bits over twelve hours; and (iii) 3180 bits over twelve hours. Additionally, the historical application runs data set includes information corresponding to the most immediately previous version, or "baseline run," of ExampleApp, version 4, which includes the following performance metrics: (i) 2850 CPU ticks over six hours; (ii) 5970 bits over six hours; and (iii) 1500 bits over six hours. The baseline version will be used in future operations as the basis for comparisons.

In alternative embodiments, other metrics may be included in addition or substitute to those listed above, or there may be many more runs corresponding to many different versions of an application. In another alternative embodiment, the performance metrics may correspond to much more finely grained aspects of a given application, such as CPU/IO/network performance of individual modules, services, microservices or other such sub-portions of a given application.

Processing proceeds to operation S260, where test run monitoring mod 306 monitors diagnostic information of the current test run of an updated application. In this simplified embodiment, the current test run is a test run of version 5 of ExampleApp, which has been operational and "running" for one hour. In this example embodiment, monitoring the diagnostic information of version 5 of ExampleApp includes monitoring the following performance metrics: (i) CPU cycles across the entire run of the version; (ii) input/output (IO) interface bits across the entire run of the version; and (iii) network interface upload/download bits across the entire run of the version. In this example embodiment, the values measured during this run are as follows: (i) 700 ticks over one hour; (ii) 1100 bits over one hour; and (iii) 460 bits over one hour. In alternative embodiments, other metrics may be included in addition or substitute to those listed above. In another alternative embodiment, the performance metrics may correspond to much more finely grained aspects of a given application, such as CPU/IO/network performance of individual modules, services, microservices or other such sub-portions of a given application.

Processing proceeds to operation S265, where data pre-processor mod 308 pre-processes data from monitored diagnostic information and historical application runs. In this example embodiment, the monitored diagnostic information and historical application runs are pre-processed to enable accurate comparisons in future operations of this embodiment. In this example embodiment, pre-processing entails averaging the performance metrics in the historical application runs data set and the monitored diagnostic information of the current test run into per-hour values. In this example embodiment, the monitored diagnostic information of the current test run is already measured in the context of a single hour and includes the following performance metrics: (i) 700 ticks over one hour; (ii) 1100 bits over one hour; and (iii) 460 bits over one hour.

The performance metrics for version 1 of the historical application runs data set of ExampleApp are as pre-processed follows: (i) 5000 ticks over ten hours is pre-processed by dividing the 5000 ticks by the 10 hours, resulting in 500 ticks over one hour; (ii) 10000 bits over 10 hours is pre-processed by dividing the 10000 bits by the 10 hours, resulting in 1000 bits over one hour; and (iii) 3000 bits over ten hours is pre-processed by dividing the 3000 bits by the 10 hours, resulting in 300 bits over one hour. The performance metrics for version 2 of the historical application runs data set of ExampleApp are as pre-processed follows: (i) 4400 ticks over 8 hours is pre-processed by dividing the 4400 ticks by the 8 hours, resulting in 550 ticks over one hour; (ii) 8030 bits over 8 hours is pre-processed by dividing the 8040 bits by the 8 hours, resulting in 1005 bits over one hour; and (iii) 2200 bits over eight hours is pre-processed by dividing the 2200 bits by the 8 hours, resulting in 275 bits over one hour. The performance metrics for version 3 of the historical application runs data set of ExampleApp are as pre-processed follows: (i) 6300 ticks over twelve hours is pre-processed by dividing the 6300 ticks by the 12 hours, resulting in 525 ticks over one hour; (ii) 12120 bits over twelve hours is pre-processed by dividing the 12120 bits by the 12 hours, resulting in 1010 bits over one hour; and (iii) 3180 bits over 12 hours is pre-processed by dividing the 3180 ticks by the 12 hours, resulting in 265 bits over one hour. The performance metrics for version 4 of the historical application runs data set of ExampleApp are as pre-processed follows: (i) 2850 ticks over six hours is pre-processed by dividing the 2850 ticks by the 6 hours, resulting in 475 ticks over one hour; (ii) 5970 bits over six hours is pre-processed by dividing the 5970 bits by the 6 hours, resulting in 995 bits over one hour; and (iii) 1500 bits over six hours is pre-processed by dividing the 1500 ticks by the 6 hours, resulting in 250 bits over one hour.

In alternative embodiments, other pre-processing may be required based upon differences in the underlying metrics. For example, alternative metrics for an application, when more finely grained, may have metrics corresponding to CPU usage spread across different sub-modules that are then aggregated to define the performance metric corresponding to CPU usage for the overall application. Alternative pre-processing techniques may involve eliminating irrelevant or unnecessary measurements or components which are detected by the monitoring module. In some alternative embodiments, the performance metrics are weighted by dynamically generated weights. These weights are dynamically generated based on averages of CPU cycles spent carrying out user application code (such as API calls), system OS/kernel functions, wait cycles awaiting I/O operations, and idle cycles where the CPU is not performing any tasks (corresponding to awaiting network inbound/outbound operations).

Processing proceeds to operation S270, where subset determination mod 310 determines a subset of runs most similar to the current test run. In this simplified embodiment, to determine a subset of runs, subset determination mod 310 determines three historical application runs (one for each of the three types of diagnostic information/performance metrics) as the closest to the current test run based upon the pre-processed three types of diagnostic information/performance metrics: (i) CPU cycles over an hour; (ii) input/output (IO) interface bits over an hour; and (iii) network interface upload/download bits over an hour. The closest historical application run for CPU cycles is the version 2 run, which was 550 CPU ticks over an hour, which was only 150 ticks away from the CPU cycles over the hour of the current test run. The closest historical application run for IO interface bits is the version 3 run, which was 1010 IO interface bits over an hour, which was only 90 bits away from the IO interface bits over the hour of the current test run. The closest historical application run for network interface upload/download bits is the version 1 run, which was 300 network interface upload/download bits over an hour, which was only 160 bits away from the network interface upload/download bits over the hour of the current test run. In alternative embodiments, more than one historical application run is determined for each type of diagnostic information/performance metric such that, for a given type of diagnostic information/performance metric, several historical application runs are selected as the most similar to the current test run. For example, five different historical application runs are determined to be closest to the current test run based on CPU cycles, and five other historical application runs are determined to be closest to the current test run based on IO interface bits.

Processing proceeds to operation S275, where real degradation determination mod 312 determines if the current test run indicates a real performance degradation. In this simplified embodiment, a real performance degradation is determined by comparing the pre-processed performance metrics of the historical application runs of the determined most similar runs against the pre-processed performance metrics of the baseline run. If the comparison of at least one performance metric indicates that the value is greater than the baseline performance metric values above a threshold, which is 10% in this example embodiment, then a real performance degradation is determined. In this simplified embodiment, the baseline run is version 4 of ExampleApp, which includes the following pre-processed performance metrics: (i) 475 CPU ticks over one hour; (ii) 995 IO interface bits over one hour; and (iii) 250 network interface upload/download bits over one hour. The determined run most similar for CPU ticks is the version 2 run, which included the now pre-processed CPU ticks performance metric of 550 CPU ticks over an hour. This is compared against the baseline 475 CPU ticks over an hour by dividing the 550 CPU ticks by 475 CPU ticks, resulting in a value of 1.16, or a 16% increase over the baseline value, which exceeds the threshold value for a real performance degradation, so a real performance degradation is determined. In alternative embodiments, a real performance degradation may be determined if the performance metrics of at least two of the determined subsets exceeds the baseline performance metrics. In further alternative embodiments, a real performance degradation is determined if three or more of the determined subsets exceeds the baseline performance metrics. For example, a real performance degradation is determined only if the comparison between the baseline for the CPU ticks, the IO interface bits, and the network interface upload/download bits all indicate values that exceed a predetermined threshold. In yet further alternative embodiments, where the determined subsets for each performance metric have the relevant performance metric of their constituent historical application runs averaged, the determined average values are then summed together to determine an overall performance metric for the run encapsulating the various component performance metrics (for example, CPU cycles, IO interface, network interface, etc.), which is then compared to a similar value that is derived from the performance metrics of the baseline.

In alternative embodiments, the determined subsets for the respective diagnostic information/performance metrics are, within their respective subsets, which include multiple historical application runs, averaged and weighted by the average distance between the diagnostic information of the current test run and the performance metrics of the various historical application runs of the subset. For example, if there are three historical application runs determined as having CPU performance metrics most similar to the current test run, their CPU performance metrics are averaged, and that average is weighted by the average of the distance between the CPU diagnostic information of the current test run and their respective CPU performance metrics.

Figure 4:
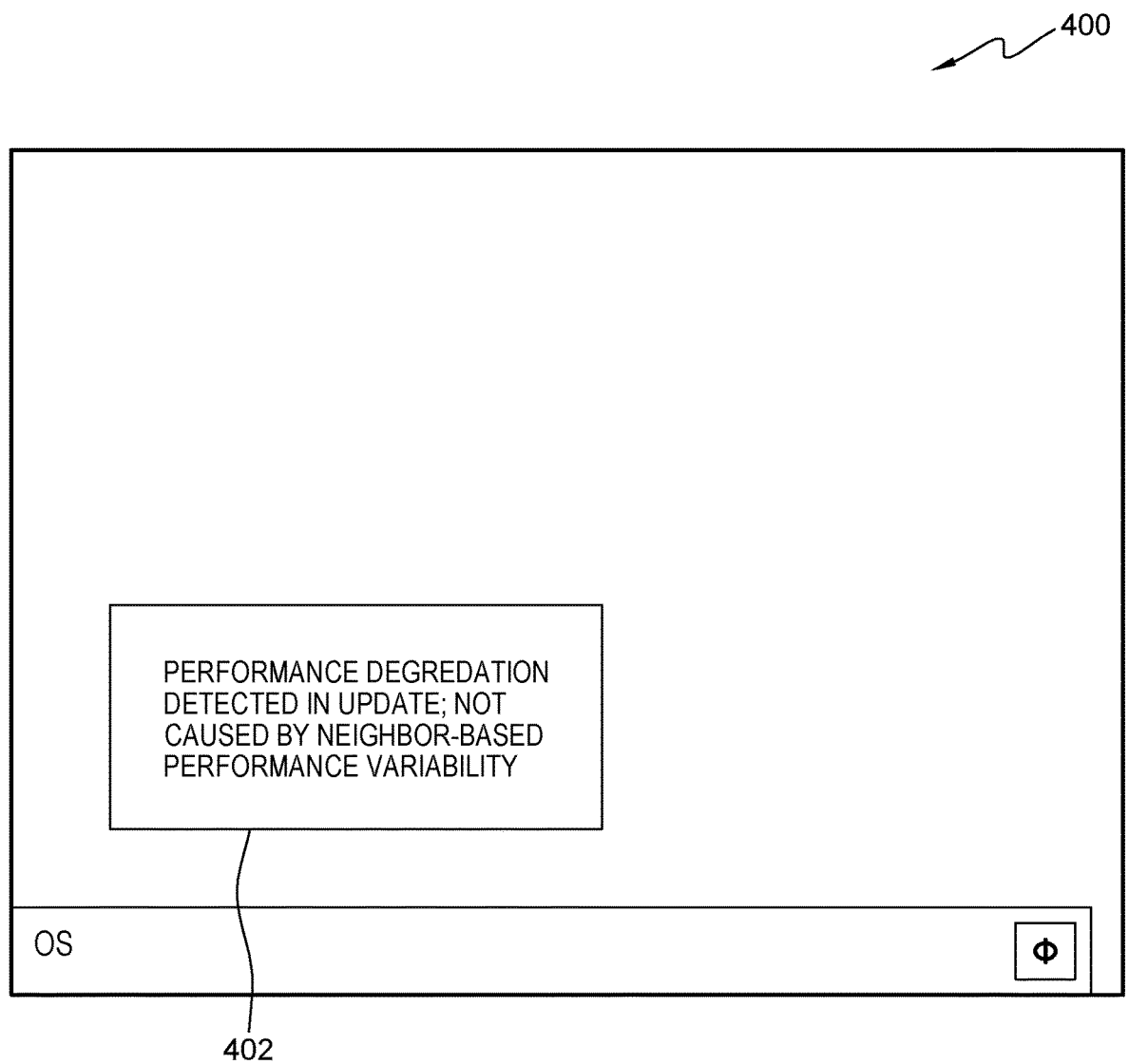
FIG. 4 is a screenshot view generated by the first embodiment system.

Processing proceeds to operation S280, where flagging mod 314 flags version 5 of ExampleApp as a real performance degradation. In this simplified embodiment, version 5 is flagged for future detailed performance analysis, and dialogue 402 of screen 400 of FIG. 4 is outputted to client 110 of FIG. 1.

Processing proceeds to operation S285 of FIG. 2, where analyzer mod 316 conducts a detailed performance analysis of version 5 of ExampleApp. In this simplified embodiment, a computer program runs a local copy of version 5 of ExampleApp and version 4 of ExampleApp and measures performance metrics for various sub-components of the respective versions, then outputs a table showing side-by-side comparisons for each performance metric and each sub-component. In an alternative embodiment, a performance engineer examines the code of ExampleApp version 5 in detail to identify performance issues causing the real performance degradation. An improvement of the embodiments of the present invention provides over the state of the art techniques is to reduce wasted resources expended on performance analysis for versions or runs of an application where a suspected performance degradation is actually caused by workloads of a "neighbor" cloud tenant operating on the same cloud. By drawing comparisons between a baseline and other historical application runs deemed most similar to the present application run, the effect of neighbor induced performance aberrations are muted in relation to determining whether a detailed performance analysis is required.

III. Further Comments and/or Embodiments

Some embodiments of the present invention recognize the following facts, potential problems and/or potential areas for improvement with respect to the current state of the art: (i) performance evaluation of a cloud based product release involves running performance workloads on the build during the ongoing release cycle for comparisons with the previous release (the previous release is also known as the baseline); any performance degradation beyond a threshold on the current release with respect to the baseline is considered a degradation; (iii) this degradation often requires the performance engineer to do an in-depth analysis to figure out the cause of the degradation and determine how optimize the code for better performance; (iv) since the cloud is multi-tenant environment there is often fluctuation in performance due to the activities of neighboring cloud tenants (where a neighboring cloud tenant is workloads sourced from other parties which are performed on the same hardware); (v) it is challenging to figure out whether a degradation is due to code change in the new release or due to the unpredictable environment; (vi) for example, a cloud based Spark service runs on virtual machines and usually the permanent storage is on 'Object Storage' or 'S3' accessed over a cloud network; (vii) when developers run performance tests on this Spark service, they often see degradations which are not real; (viii) this degradation still requires the performance engineer to do an in-depth analysis to figure out whether the regression is real or not; (xi) while there are ways to figure out whether the environment is suitable for performance tests, there are no intelligent ways to diagnose performance degradation and distinguish it from variability due to cloud neighbors.

Some embodiments of the present invention may include one, or more, of the following operations, features, characteristics and/or advantages: (i) during a performance test run, use monitoring tools to gain deep insights; (ii) the past 3 runs that are "most" similar to the current performance test run based on these diagnostics are identified; (iii) then have these similar runs to vote if the run on the test build is a real regression or variability; (iv) towards achieving this, the K Nearest Neighbours (KNN) algorithm appears to be a very natural fit; (v) KNN is a simple nonparametric algorithm that computes a similarity measure (Euclidean distance) between a test sample and all supplied training samples; (vi) the K closest neighbours then get to vote or predict the elapsed time of the test run weighted by their average distance from the test point; and (vii) the distance is taken into account to figure out how close or similar is the test point with rest of its neighbours.

Some embodiments of the present invention utilize the following mechanism to weight importance of various diagnostics that contribute to elapsed time:

Final Elapsed Time=$W1$*[Predicted elapsed time from CPU KNN cluster]+$W2$*[Predicted elapsed time from IO KNN cluster]+$W3$*[Predicted elapsed time from Network KNN cluster]

Where W1 is the average of 'user+system' CPU
W2 is the average of 'wait' CPU
W3 is a factor of 'idle' CPU and percentage of network bandwidth utilization Referring to the previous paragraph, if the computed elapsed time of baseline and predicted elapsed time of test run is within a threshold, the degradation is determined to be a false alarm. The weights attached to the diagnostic provide explainability by showing which aspect of the environment is causing fluctuation. 'user+system' refers to the sum of CPU time/cycles spent in user-space (i.e. executing application program logic) and system space (i.e. executing kernel/OS functions). Similarly, 'wait' is time spent in waiting for IO operations and 'idle' is when CPU does not have any work to do. When the application is engaged in network activity, the CPU will not have anything to do and will be 'idle' during the network operations. If a program executes for 1 hour and the CPU utilization (diagnostic) data is collected at 1 minute intervals, there are 60 instances of the diagnostic data generated. In each instance, 'user', 'system', 'wait' & 'idle' numbers for CPU are generated corresponding to CPU cycles spent carrying out those commands. The three weights above are determined as follows: W1 is determined from the average of 'user+system' of the 60 instances of diagnostic data; (ii) W2 is determined from the average of 'wait' from 60 instances of the diagnostic data; and (iii) W3 is determined from the average of 'idle' from 60 instances of the diagnostic data.

Some embodiments of the present invention may include one, or more, of the following operations, features, characteristics and/or advantages: (i) as the diagnostic data format differs, there is a need to pre-process the data that can be used in machine learning models; (ii) CPU Diagnostic data pre-processing—diagnostics like CPU profiler data or vmstat require some transformation before they can be fed into the machine learning (ML) algorithm; (iii) this is because these diagnostics generate multiple rows for each performance run; (iv) for example, the CPU profiler captures all Db2 functions that were called during query execution, as shown below: The components, module (function) names will vary based on the workload and type of application

| PQA_RUN_ID | pqa_test_id | function_name | component_name | CPU Cycles |
|---|---|---|---|---|
| 20488 | q20 | ibm_cde::query::PackedBank::evalTW_SC | cde::query | 287 |

-continued

| PQA_RUN_ID | pqa_test_id | function_name | component_name | CPU Cycles |
|---|---|---|---|---|
| 20488 | q20 | ibm_cde::query::JoinFilterEvaluator::processInputsSynchronously | cde::query | 191 |
| 20488 | q20 | ibm_cde::types::BitString::intersectWithNumBitsSingleRegionBlock | cde::types | 146 |
| 20488 | q20 | ibm_cde::services::Heap::allocMem | cde::services | 122 |
| 20488 | q20 | sqloFastThreadAllocator::allocMem | sqlo | 118 |
| 20488 | q20 | ibm_cde::query::CheckRowStatusEvaluator::processInputsSynchronously | cde::query | 116 |
| 20488 | q20 | ibm_cde::query::HashEvaluator::processVector | cde::query | 86 |
| 20488 | q20 | ibm_cde::types::BitString::andWithExpandedFast | cde::types | 83 |
| 20488 | q20 | ibm_cde::services::Heap::freeMem | cde::services | 71 |
| 20488 | q20 | ibm_cde::query::BankUnpacker::getCodes | cde::query | 71 |
| 20488 | q20 | ibm_cde::query::Evaluator::evaluate | cde::query | 68 |
| 20488 | q20 | sqlbFindPageInBPOrSim | sqlb | 52 |
| 20488 | q20 | sqloGetPoolHandleFromBlkPointer | sqlo | 51 |
| 20488 | q20 | ibm_cde::services::SharedLatch::getLatch | cde::services | 49 |
| 20488 | q20 | sqloFastThreadAllocator::freeMem | sqlo | 47 |
| 20488 | q20 | sqliBinSearchLastRidOrPrevPrefixCompPg | sqli | 45 |

To reduce the dimensionality, this technique sums up the CPU cycles spent in functions based on their component. Next, create a table with a column for each component_name and update it such that it generates one row per run. After the above data undergoes this transformation, it becomes a table with two rows and forty-two columns. The first row, a header row including the corresponding component_names, includes the following columns: (1) PQA_RUN_ID; (2) pqa_test_id; (3) pqa_execution_id; (4) cde; (5) cde_data; (6) cde_query; (7) cde_services; (8) cde_types; (9) cli; (10) csm; (11) GLUE; (12) LIB_P-THREAD; (13) LIB_STDC; (14) pd; (15) sqk; (16) sqlb; (17) sqld; (18) sqle; (19) sqlf; (20) sqli; (21) sqlj; (22) sqlk; (23) sqlm; (24) sqln; (25) sqlnls; (26) sqlo; (27) sqlp; (28) sqlpg; (29) sqlpl; (30) sqlr; (31) sqlra; (32) sqlri; (33) sqlrihsjn; (34) sqlrl; (35) sqlrr; (36) sqlrs; (37) sqls; (38) sqlt; (39) sqlv; (40) sqlz; (41) stmm; and (42) UNKNOWN. The second row includes the following 42 columns corresponding to the summed CPU cycles spent in functions corresponding to the relevant component, with the exception of the first three columns which correspond to the PQA_RUN_ID, pqa_test_id and pqa_execution_id: (1) 20449; (2) q20; (3) 3; (4) NULL; (5) NULL; (6) 749; (7) 111; (8) 121; (9) NULL; (10) NULL; (11) NULL; (12) NULL; (13) NULL; (14) NULL; (15) NULL; (16) 147; (17) NULL; (18) NULL; (19) NULL; (20) 106; (21) NULL; (22) NULL; (23) NULL; (24) NULL; (25) NULL; (26) 157; (27) NULL; (28) NULL; (29) NULL; (30) NULL; (31) NULL; (32) NULL; (33) NULL; (34) NULL; (35) NULL; (36) NULL; (37) NULL; (38) NULL; (39) NULL; (40) NULL; (41) NULL; and (42) NULL.

To further reduce dimensionality, columns that have constant value for all rows are dropped (for example, columns with a NULL value in this case). This can be achieved by the following command:
X.drop([col for col, val in X.mean( ).iteritems( ) if val==0], axis=1, inplace=True) The first row of the resulting table would include only the following nine columns: (1) PQA_RUN_ID; (2) pqa_test_id; (3) pqa_execution_id; (4) cde_query; (5) cde_services; (6) cde_types; (7) sqlb; (8) 106; and (9) sqlo. The second row of the resulting table would include only the following nine columns: (1) 20449; (2) q20; (3) 3; (4) 749; (5) 111; (6) 121; (7) 147; (8) 106; and (9) 157.

Some embodiments of the present invention utilize the Iostat tool for retrieving IO diagnostic data, to be used in pre-processing. An example output based on Iostat is shown below. First, calculate average metrics for each device across the run. Then, depending on whether the metrics is a rate or a counter, calculate the average or sum of the metric to arrive at a single row per run, shown in the following example table of sixteen columns and five rows. Typically, iostat includes the following 16 metrics (columns): (1) Device; (2) r/s; (3) w/s; (4) rkB/s; (5) wkB/s; (6) rrqm/s; (7) wrqm/s; (8) % rrqm; (9) % wrqm; (10) r_await; (11) w_await; (12) aqu-sz; (13) rareq-sz; (14) wareq-sz; (15) svctm; and (16) % util. These metrics might vary based on the Operating System used in the Cloud infrastructure. The second row includes the following sixteen columns: (1) loop0; (2) 0.00; (3) 0.00; (4) 0.00; (5) 0.00; (6) 0.00; (7) 0.00; (8) 0.00; (9) 0.00; (10) 0.00; (11) 0.00; (12) 0.00; (13) 1.60; (14) 0.00; (15) 0.00; and (16) 0.00. The third row includes the following sixteen columns: (1) vda; (2) 0.32; (3) 0.16; (4) 14.72; (5) 4.14; (6) 0.00; (7) 0.01; (8) 0.07; (9) 8.24; (10) 1.34; (11) 6.93; (12) 0.00; (13) 45.31; (14) 25.78; (15) 0.33; and (16) 0.02. The fourth row includes the following sixteen columns: (1) dm-0; (2) 0.29; (3) 0.15; (4) 14.06; (5) 4.14; (6) 0.00; (7) 0.00; (8) 0.00; (9) 0.00; (10) 1.43; (11) 7.12; (12) 0.00; (13) 48.43; (14) 28.44; (15) 0.97; and (16) 0.04. The fifth and final row includes the following sixteen columns: (1) dm-1; (2) 0.01; (3) 0.00; (4) 0.20; (5) 0.00; (6) 0.00; (7) 0.00; (8) 0.00; (9) 0.00; (10) 1.17; (11) 0.00; (12) 0.00; (13) 22.87; (14) 0.00; (15) 0.96; and (16) 0.00.

Some embodiments of the present invention utilize the Netstat tool for retrieving network diagnostic data, to be used in pre-processing. An example output based on Netstat is shown below. An example output based on Netstat is shown below. The metrics and actual column names might vary based on the Operating System used in the Cloud infrastructure. First, calculate the average metrics for each interface across the run. Then, calculate the sum of each metric to arrive at a single row per run, shown in the following example kernel interface table of eleven columns and four rows. The first row, a header row, includes the following eleven columns: (1) Iface; (2) MTU; (3) RX-OK; (4) RX-ERR; (5) RX-DRP; (6) RX-OVR; (7) TX-OK; (8) TX-ERR; (9) TX-DRP; (10) TX-OVR; and (11) Flg. The second row includes the following eleven columns: (1) ens3; (2) 1500; (3) 81835978; (4) 0; (5) 184; (6) 0; (7) 37; (8) 0; (9) 0; (10) 0; and (11) BMRU. The third row includes the following eleven columns: (1) ens7; (2) 1500; (3) 53967; (4) 0; (5) 17; (6) 0; (7) 3265; (8) 0; (9) 0; (10) 0; and (11) BMRU. The fourth and final row includes the following eleven columns: (1) lo; (2) 65536; (3) 16; (4) 0; (5) 0; (6) 0; (7) 16; (8) 0; (9) 0; (10) 0; and (11) LRU.

Figure 5:
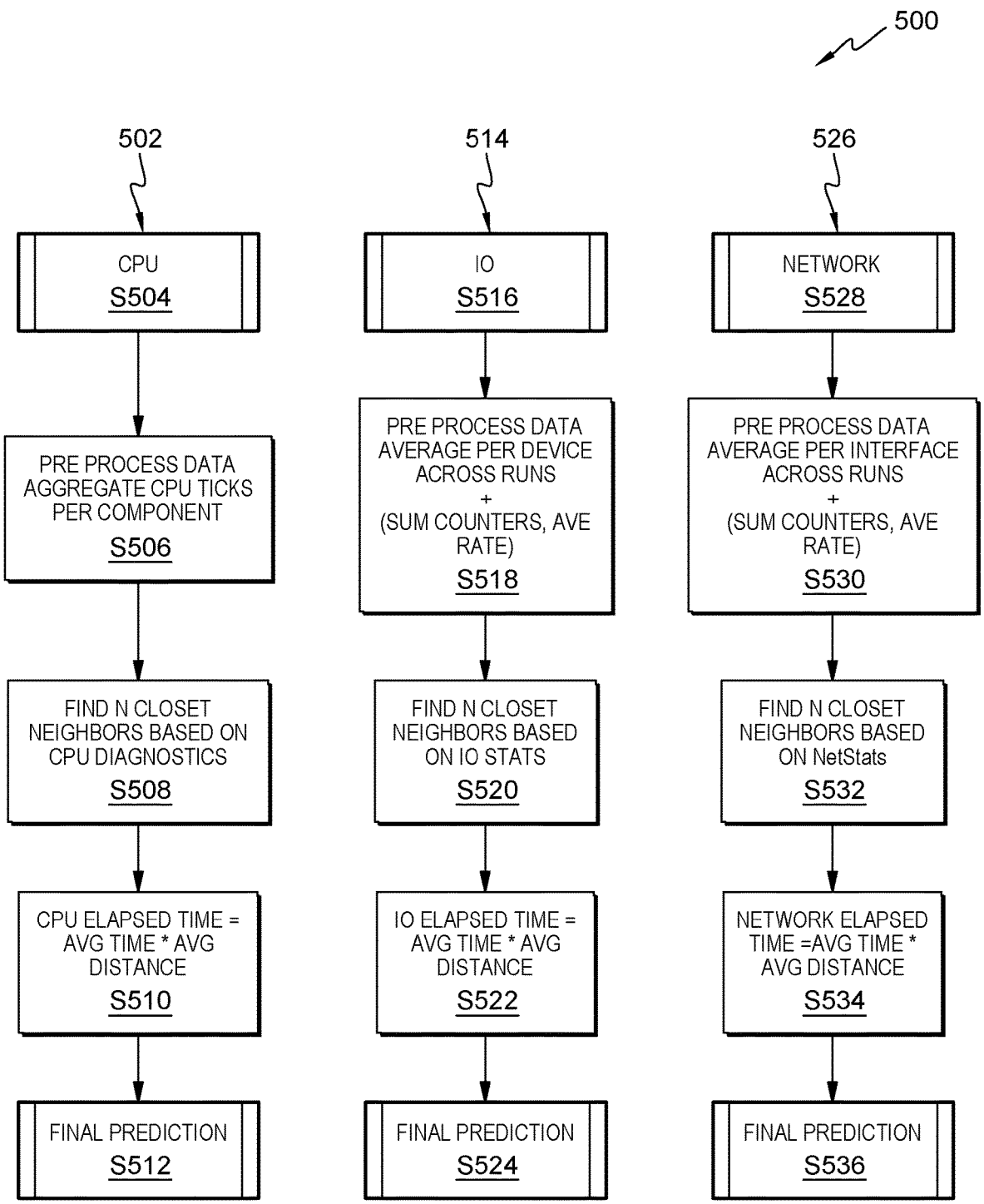
FIG. 5 is a flowchart showing a second embodiment method.

Some embodiments of the present invention include a method shown in flowcharts 502, 514 and 526 of diagram 500 of FIG. 5. Flowchart 502 includes the following steps in the following order: (i) S504; (ii) S506; (iii) S508; (iv) S510; and (v) S512. Flowchart 514 includes the following steps in the following order: (i) S516; (ii) S518; (iii) S520; (iv) S522; and (v) S524. Flowchart 526 includes the following steps in the following order: (i) S528; (ii) S530; (iii) S532; (iv) S534; and (v) S536.

Figure 6:
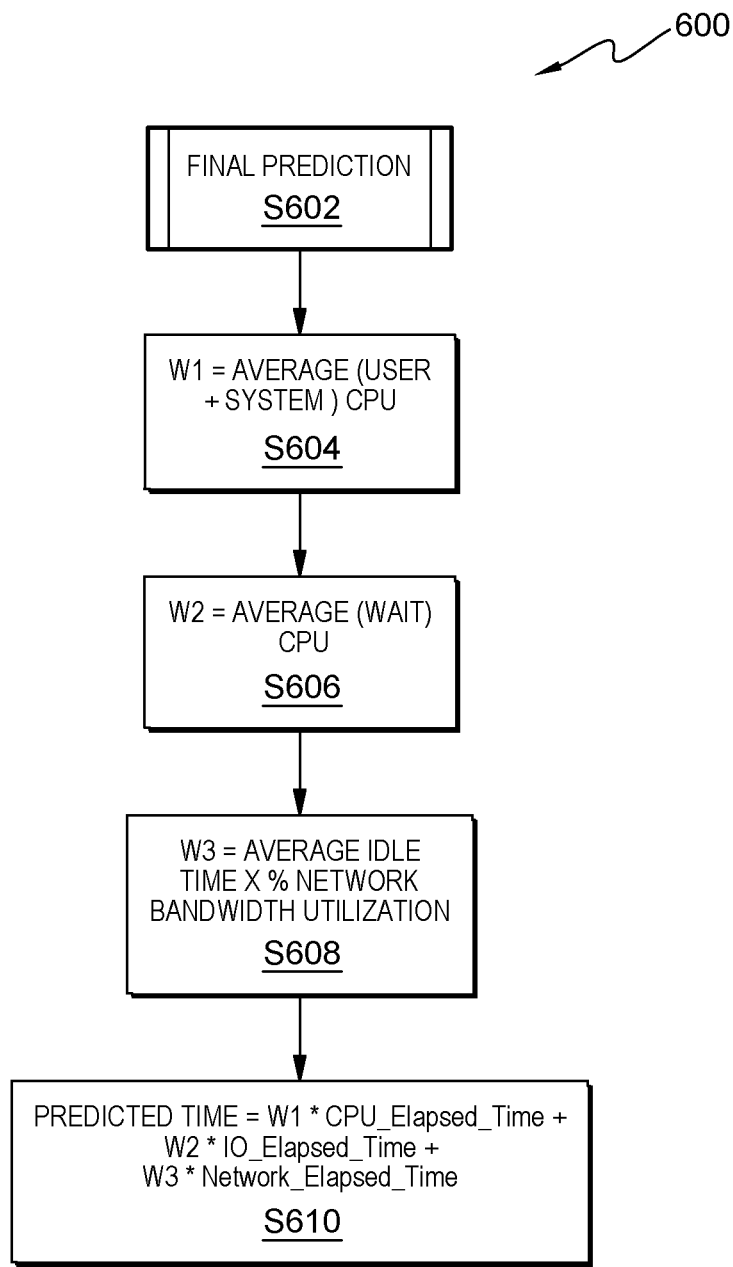
FIG. 6 is a flowchart showing another aspect of the second embodiment method.

Some embodiments of the present invention include a method shown in flowchart 600 of FIG. 6, which includes the following steps in the following order: (i) S602; (ii) S604; (iii) S606; (iv) S608; and (v) S610.

Some embodiments of the present invention may include one, or more, of the following operations, features, characteristics and/or advantages: (i) determine whether a performance dip is due to changes done in the codepath or due to noise in a totally unsupervised way manner; (ii) not necessary to explicitly train with labeled data; (iii) nor depend on artificial simulations to inject anomalies; (iv) leverage past runs to find run closest to the current run having similar metrics and validate performance in a totally unsupervised/ automatic way; (v) since the technique is unsupervised, the means of detection are robust and flexible to changes in the environment; (vi) use K Nearest Neighbors (KNN), a simple nonparametric algorithm that computes a similarity measure (Euclidean distance) between a test sample and all training samples; (vii) the K closest neighbors then get to vote or predict the elapsed time of the test run; (viii) consider secondary metrics like CPU, IO and network utilization to estimate the response time based on the previously collected data; (ix) this ensures that if there are any changes in the codepath of the transaction, it will be detected by the model and will be flagged as a genuine codepath regression rather than variability due to noisy neighbours in the cloud environment; (x) how to detect performance impact due to noisy neighbours or variations in cloud environment; (xi) detect and flag performance variations in cloud environments using the k-means clustering model; (xii) determine performance variation without either: (a) executing the workload in a controlled environment, or (b) matching the behaviour with another controlled test workload; (xiii) based on the normal execution of the workload in cloud environments, detect performance variation and if there is any genuine codepath regression in the workload; (xiv) work on any cloud platform irrespective of the cloud architecture; and (xv) detecting performance variations in cloud environments and figuring out if any application code issue is affecting performance.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
receiving a historical run data set corresponding to historical runs of a cloud application;
executing a current test run of an updated version of the cloud application;
measuring performance metrics of one or more subcomponents corresponding to the executed current test run of the cloud application;
determining a subset of runs from clustered historical run data sets which are most similar to the current test run based on the measured performance metrics, wherein the subset of runs most similar to the current test run are selected based, at least in part, on a K nearest neighbors (KNN) clustering technique; and automatically validating that the current test run is a real performance degradation based on the determined subset of runs.

2. The CIM of claim 1, further comprising:

flagging the updated version of the cloud application for in-depth performance analysis based, at least in part, on the automatic validation; and responsive to flagging the updated version of the cloud application, analyzing the updated version of the cloud application for performance degradation.

3. The CIM of claim 1, wherein:

the subset of runs includes at least three separate subsets of runs, with at least one subset of runs for each of the following three performance metrics: (i) central processing unit (CPU) usage, (ii) input/output (IO) interface usage, and (iii) network interface usage; and the separate subsets of runs each include at least two runs.

4. The CIM of claim 3, wherein:

the three performance metrics are respectively weighted by dynamically generated weights;

the dynamically generated weight for the CPU usage performance metrics is based, at least in part, on an average of sums of CPU cycles used executing machine logic corresponding to both user-space and system-space, recorded in the separate subset of runs;

the dynamically generated weight for the IO interface usage performance metrics is based, at least in part, on an average of CPU wait cycles recorded in the separate subset of runs; and the dynamically generated weight for the network interface usage performance metrics is based, at least in part, on an average of CPU idle cycles and a percentage of network interface bandwidth utilization.

5. The CIM of claim 1, where the automatic validation is based, at least in part, on a comparison of performance metrics of the determined subset of runs against a baseline run.

6. A computer program product (CPP) comprising:

one or more computer readable storage media having computer-readable program instructions stored on the one or more computer readable storage media, said program instructions executes a computer-implemented method comprising steps of:

receiving a historical run data set corresponding to historical runs of a cloud application, executing a current test run of an updated version of the cloud application, measuring performance metrics of one or more subcomponents corresponding to the executed current test run of the cloud application, determining a subset of runs from clustered historical run data sets which are most similar to the current test run based on the measured performance metrics, wherein the subset of runs most similar to the current test run are selected based, at least in part, on a K nearest neighbors (KNN) clustering technique, and automatically validating that the current test run is a real performance degradation based on the determined subset of runs.

7. The CPP of claim 6, wherein the computer code further includes instructions for causing the processor(s) set to perform the following operations:

flagging the updated version of the cloud application for in-depth performance analysis based, at least in part, on the automatic validation; and responsive to flagging the updated version of the cloud application, analyzing the updated version of the cloud application for performance degradation.

8. The CPP of claim 6, wherein:

the subset of runs includes at least three separate subsets of runs, with at least one subset of runs for each of the following three performance metrics: (i) central processing unit (CPU) usage, (ii) input/output (IO) interface usage, and (iii) network interface usage; and the separate subsets of runs each include at least two runs.

9. The CPP of claim 8, wherein:

the three performance metrics are respectively weighted by dynamically generated weights;

the dynamically generated weight for the CPU usage performance metrics is based, at least in part, on an average of sums of CPU cycles used executing machine logic corresponding to both user-space and system-space, recorded in the separate subset of runs;

the dynamically generated weight for the IO interface usage performance metrics is based, at least in part, on an average of CPU wait cycles recorded in the separate subset of runs; and the dynamically generated weight for the network interface usage performance metrics is based, at least in part, on an average of CPU idle cycles and a percentage of network interface bandwidth utilization.

10. The CPP of claim 6, where the automatic validation is based, at least in part, on a comparison of performance metrics of the determined subset of runs against a baseline run.

11. A computer system (CS) comprising:

one or more computer processors;

one or more computer readable storage media having computer readable program instructions stored on the one or more computer readable storage media for execution by at least one of the one or more processors, the stored program instructions execute a computer-implemented method comprising steps of:

receiving a historical run data set corresponding to historical runs of a cloud application, executing a current test run of an updated version of the cloud application, measuring performance metrics of one or more subcomponents corresponding to the executed current test run of the cloud application, determining a subset of runs from clustered historical run data sets which are most similar to the current test run based on the measured performance metrics, wherein the subset of runs most similar to the current test run are selected based, at least in part, on a K nearest neighbors (KNN) clustering technique, and automatically validating that the current test run is a real performance degradation based on the determined subset of runs.

12. The CS of claim 11, wherein the computer code further includes instructions for causing the processor(s) set to perform the following operations:

flagging the updated version of the cloud application for in-depth performance analysis based, at least in part, on the automatic validation; and responsive to flagging the updated version of the cloud application, analyzing the updated version of the cloud application for performance degradation.

13. The CS of claim 11, wherein:

the subset of runs includes at least three separate subsets of runs, with at least one subset of runs for each of the following three performance metrics: (i) central processing unit (CPU) usage, (ii) input/output (IO) interface usage, and (iii) network interface usage; and the separate subsets of runs each include at least two runs.

14. The CS of claim 13, wherein:

the three performance metrics are respectively weighted by dynamically generated weights;

the dynamically generated weight for the CPU usage performance metrics is based, at least in part, on an average of sums of CPU cycles used executing machine logic corresponding to both user-space and system-space, recorded in the separate subset of runs;

the dynamically generated weight for the TO interface usage performance metrics is based, at least in part, on an average of CPU wait cycles recorded in the separate subset of runs; and the dynamically generated weight for the network interface usage performance metrics is based, at least in part, on an average of CPU idle cycles and a percentage of network interface bandwidth utilization.

15. The CS of claim 11, where the automatic validation is based, at least in part, on a comparison of performance metrics of the determined subset of runs against a baseline run.

\* \* \* \* \*